United States Patent Office 3,364,940
Patented Jan. 23, 1968

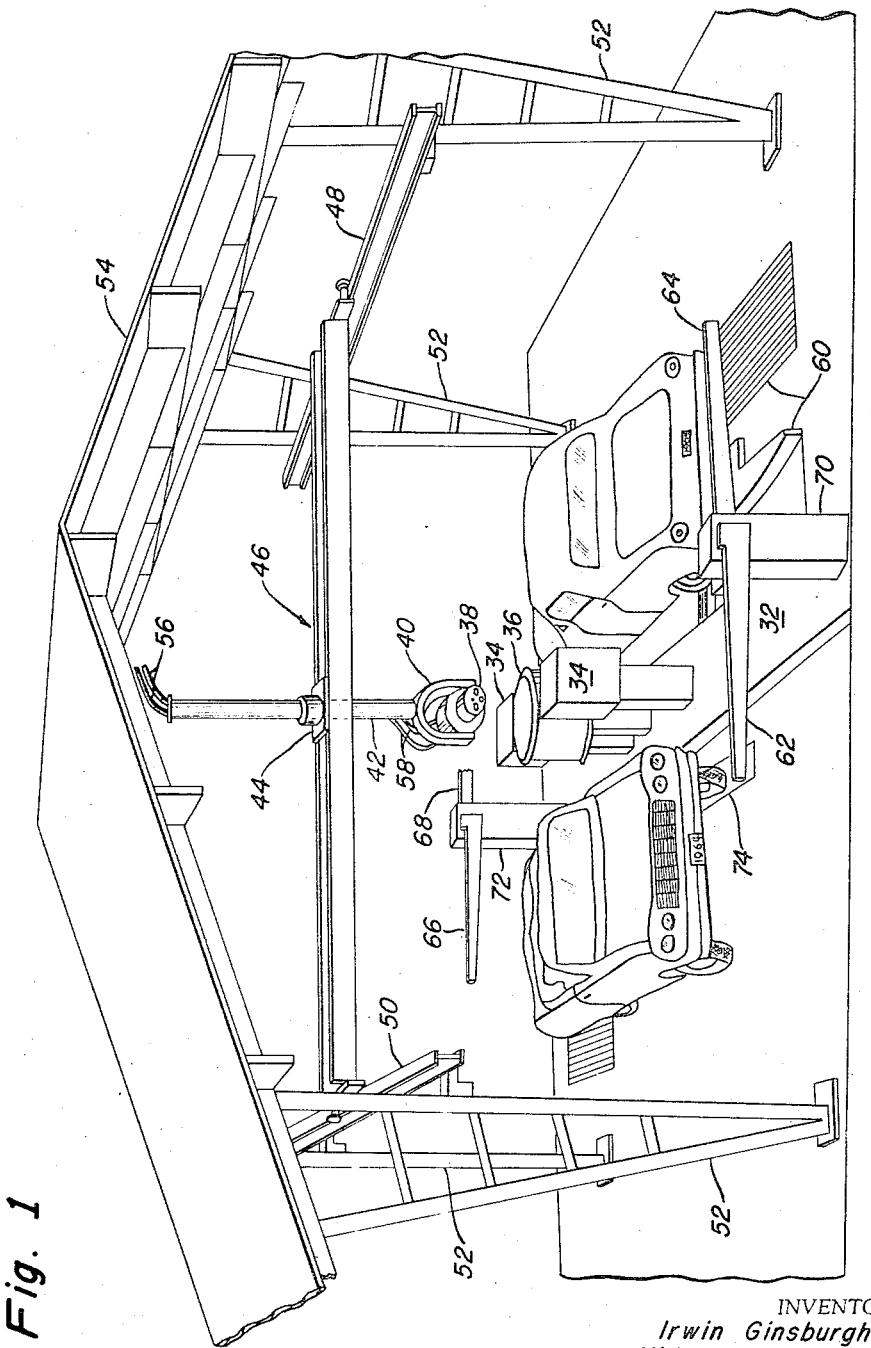

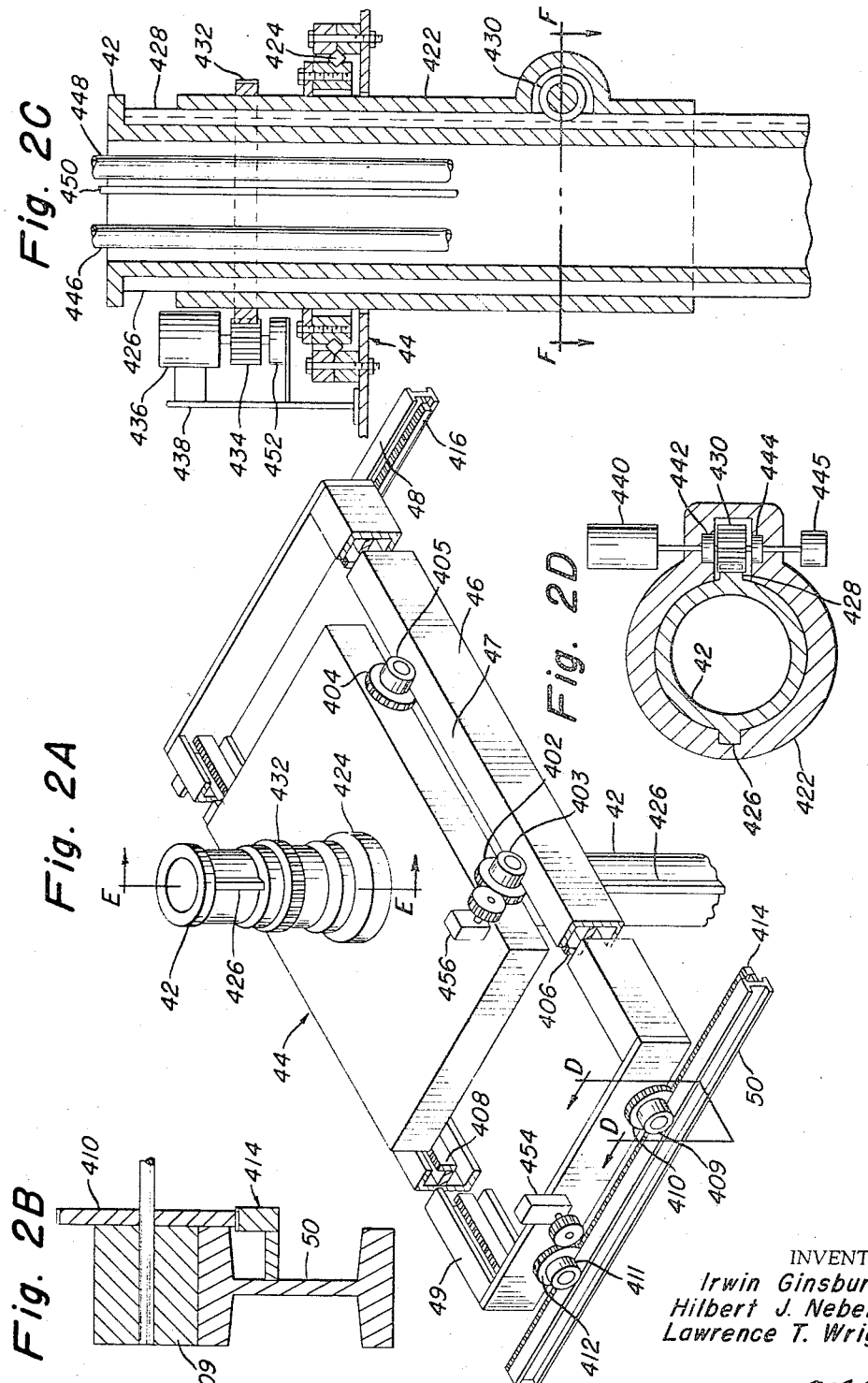

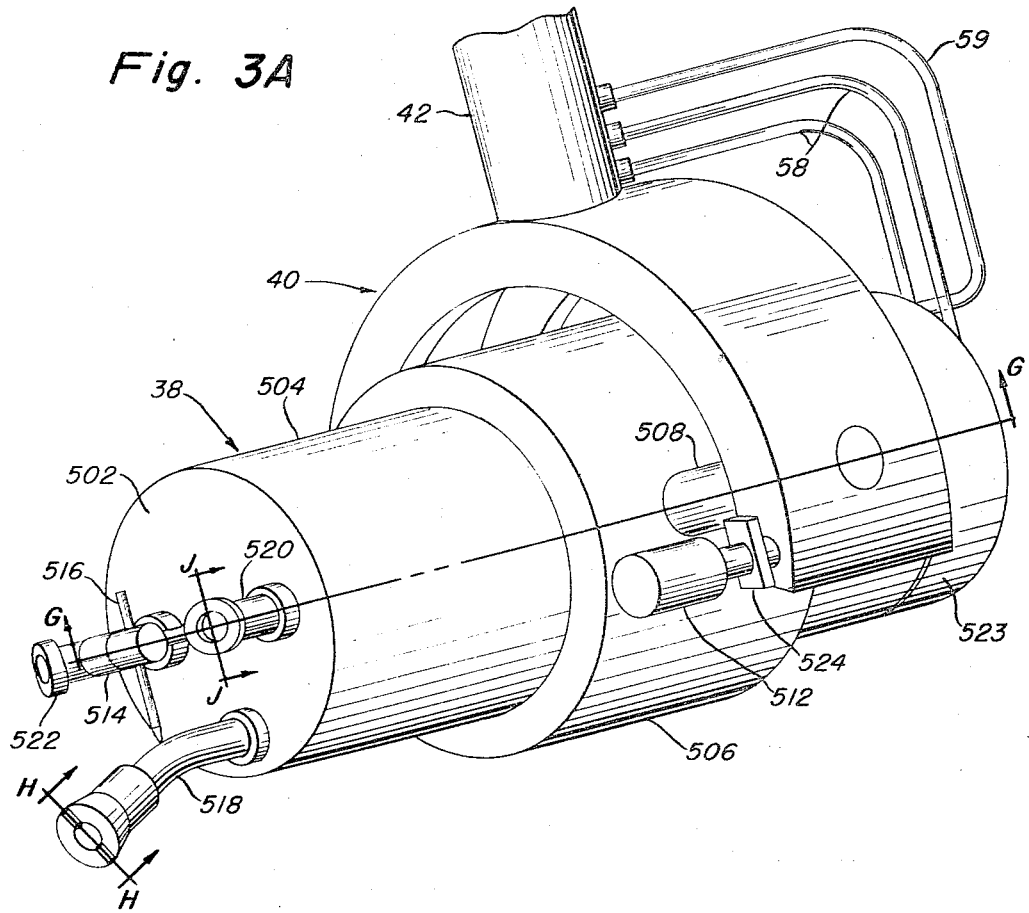
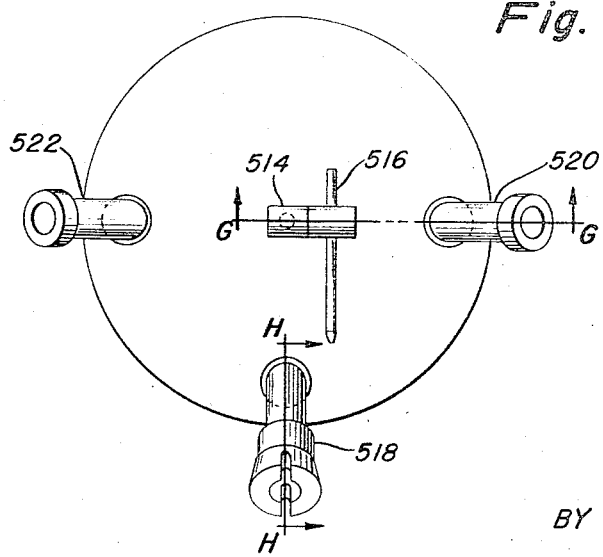

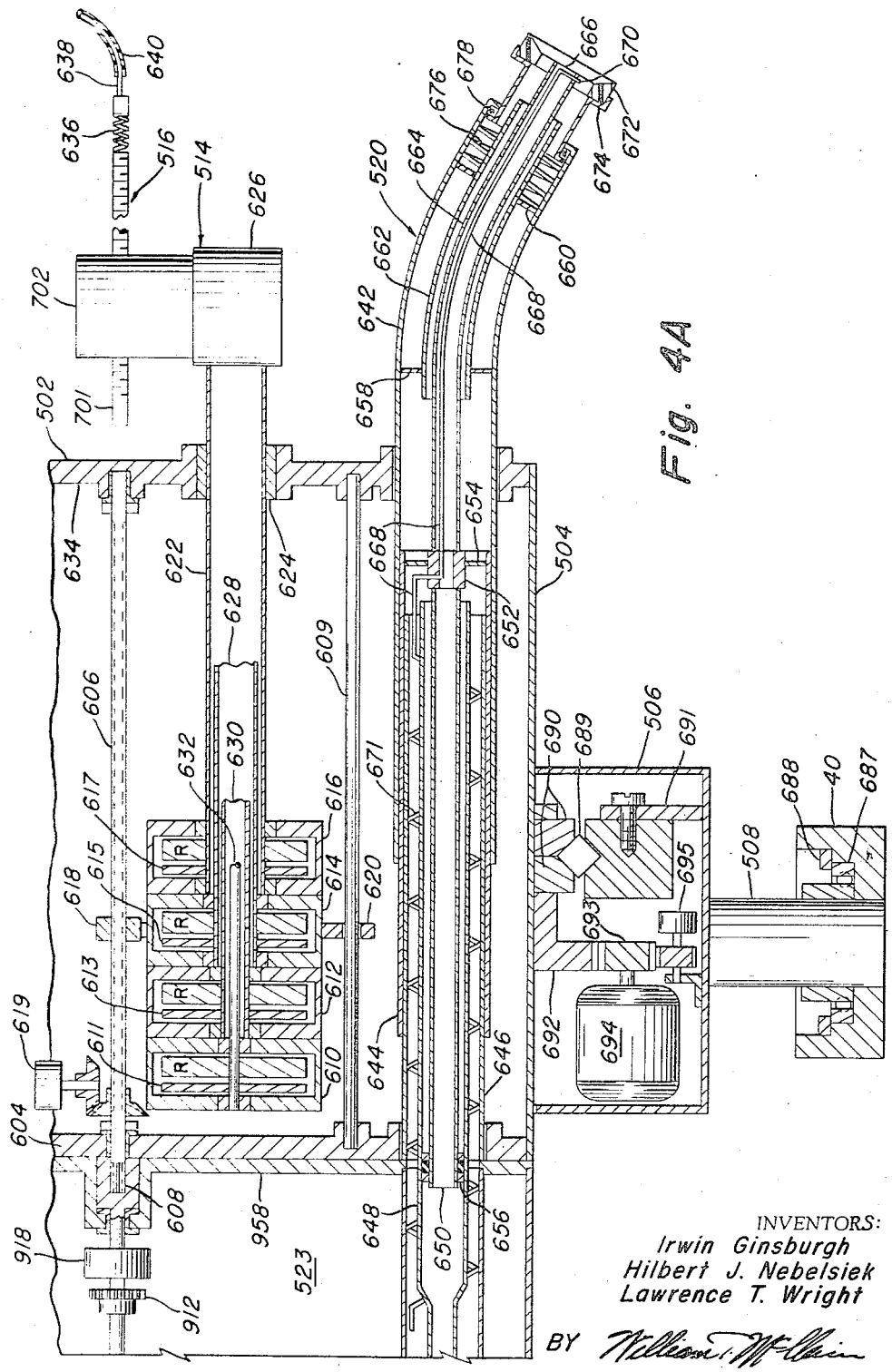

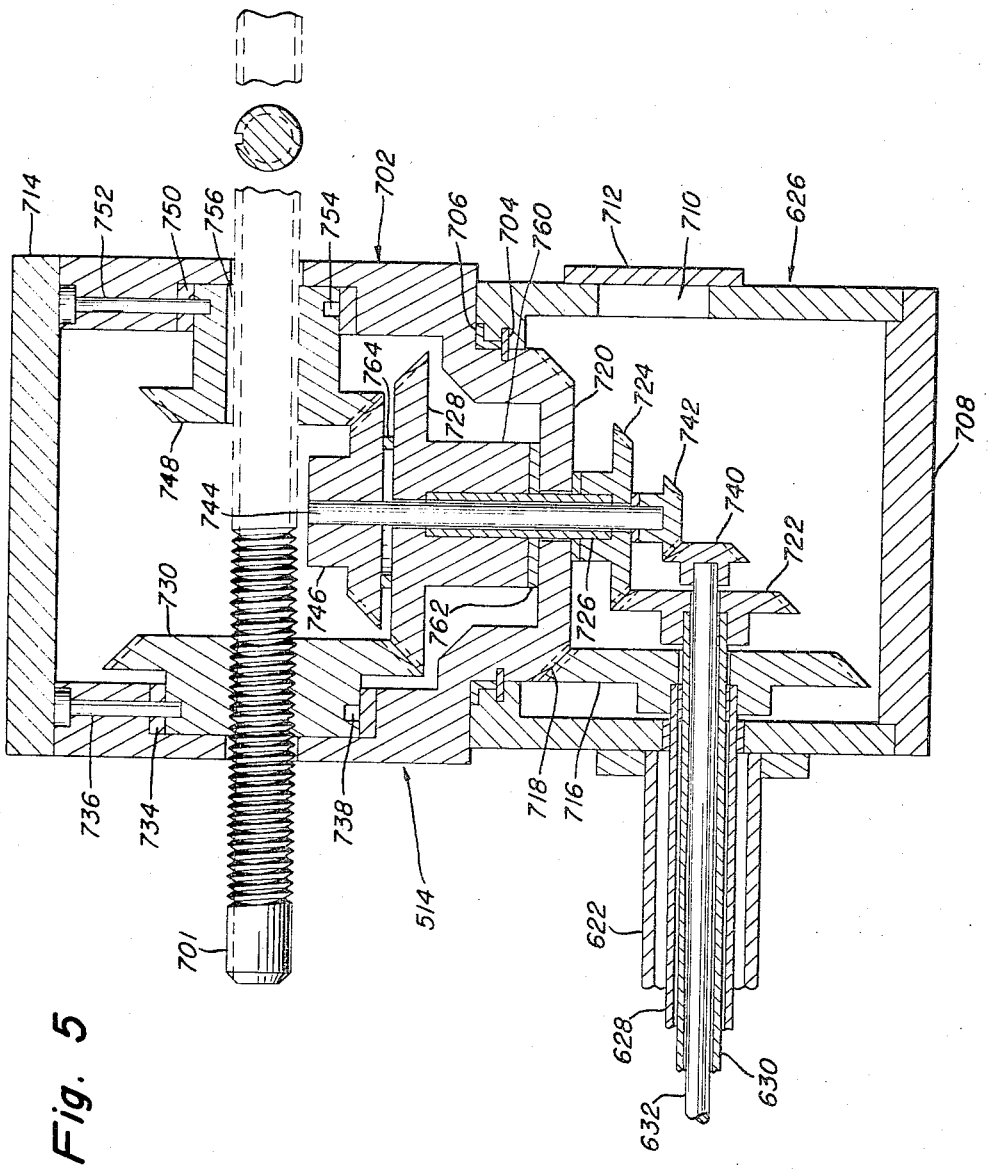

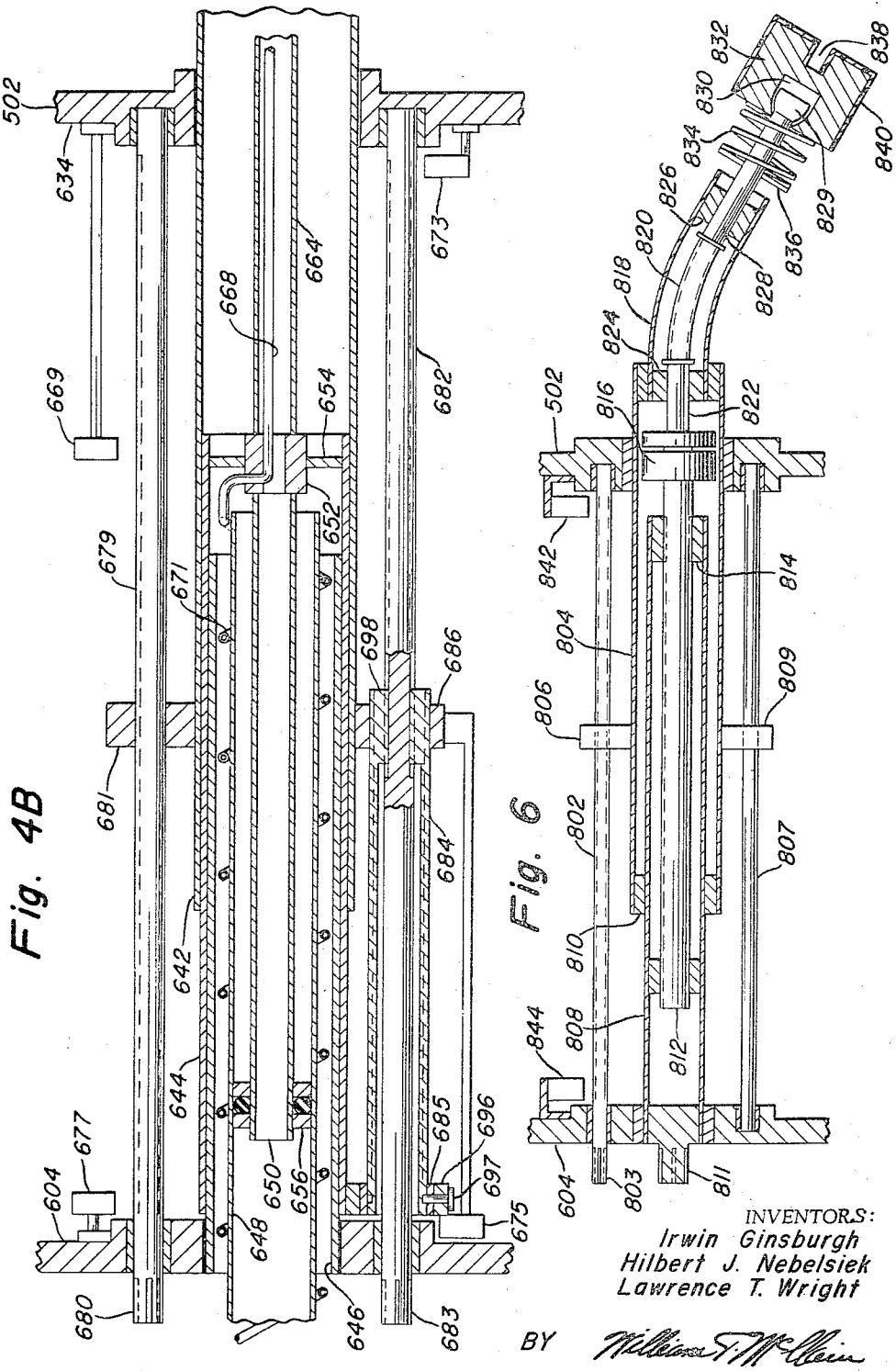

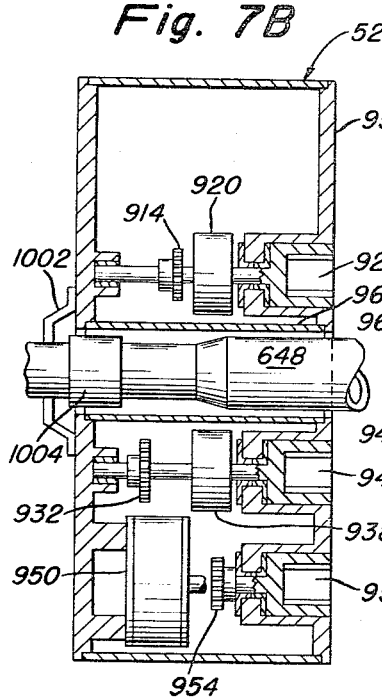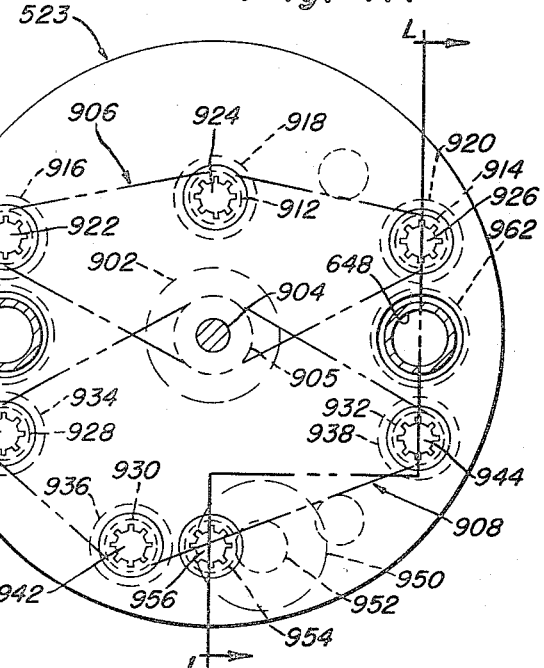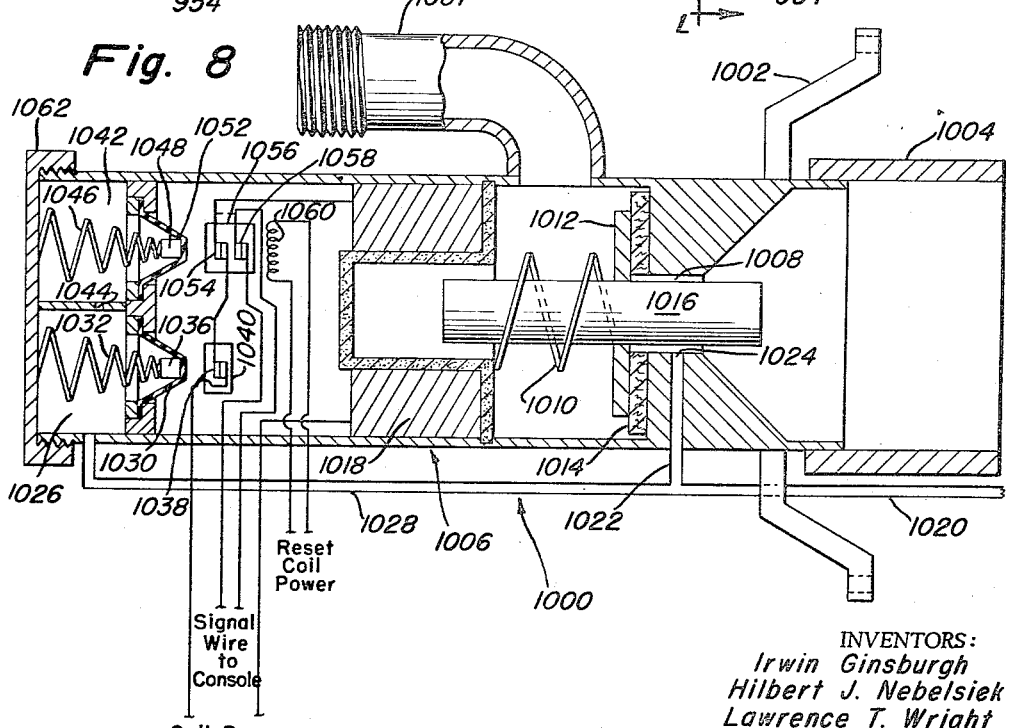

3,364,940
FUEL DISPENSING APPARATUS
Irwin Ginsburgh, Morton Grove, Ill., Hilbert J. Nebelsiek, Highland, Ind., and Lawrence T. Wright, Homewood, Ill., assignors to Standard Oil Company, Chicago, Ill., a corporation of Indiana
Filed Mar. 19, 1965, Ser. No. 441,061
34 Claims. (Cl. 137—234.6)

ABSTRACT OF THE DISCLOSURE

Apparatus for dispensing a fluid into the tank of a vehicle including, a dispensing head connected to a frame, fluid supply means connected to the head, positioning means for moving the head, nozzle means positioned in the head and extendible and retractable therefrom, valve means connected to the fluid supply means for controlling the flow of fluid, control means connected to the valve means for opening and closing the valve means, flap-opening means for opening and closing a flap, and means for automatically shutting off the valve means when the tank is full.

---

This invention relates to apparatus for transferring a liquid from fuel storage to a mobile tank, and, more particularly, it concerns a dispensing head for use in automatically fueling automotive vehicles at retail gasoline and fuel oil stations.

In co-pending application Serial No. 410,913, filed November 13, 1964, by I. Ginsburgh, there is disclosed an automatically controlled fueling system for automotive vehicles. The apparatus of the present invention is particularly well-adapted for use in such an automotive fueling system.

Briefly, the present invention provides an apparatus for dispensing a fluid into a tank, such as the fuel tank of an automotive vehicle, which apparatus comprises a frame member, a dispensing head member connected to said frame member, fluid supply means connected to said head member, positioning means connected to said head member for moving said head member from a neutral reference point to a known location corresponding to the inlet of said tank, nozzle means positioned in said head member and connected to said fluid supply means, said nozzle means being extendible from and retractable into said head member, nozzle projection means connected to said nozzle means for alternately extending said nozzle means outwardly from said head member and retracting said nozzle means into said head member, valve means connected to said fluid supply means for controlling the flow of fluid therethrough, and control means connected to said valve means for opening said valve means when said nozzle is extended from said head member and for subsequently closing said valve means. Preferably, the apparatus further includes a flap-opening mechanism for opening and closing a flap over the tank inlet, and, advantageously, further comprises means for removing the cap of the tank inlet. The apparatus is preferably provided with means for automatically shutting off the valve means when the tank is filled and may be also provided with means for resetting the valve means when the valve is temporarily closed during the dispensing operation.

Before describing the present invention in detail, it will be advantageous to refer to the above-mentioned automatic fueling system which is briefly described in connection with the accompanying FIGURE 1, which is an isometric schematic view of a refueling station equipped with the automatic dispensing equipment described in the aforesaid application Serial No. 410,913. FIGURE 1 shows two automobiles in position for refueling on each side of an island 32 (as that term is used in the gasoline retailing business) upon which is disposed two typical gasoline pump stands 34. Inbetween the pumps is a console 36 which bears a number of buttons or switches through which the driver of the automobile exchanges with the apparatus information regarding the identification of the automobile in terms of its model year, manufacturer, model and body style, and the type and amount of fuel desired.

Above console 36 is dispensing head 38 suspended in yoke 40 from a vertical elevator 42. Elevator 42 is carried by, and extends above, carriage 44 which is supported by and traverses along bridge 46, which in turn is supported by and traverses along crane rails 48 and 50. Posts 52 support the crane rails and also support optional roof 54. Two fuel hoses 56 are shown entering the top of elevator 42 and lead into the elevator from fuel pumping means not shown, which draws fuel from a fuel storage tank, also not shown. Flexible hoses 58 lead from the base of elevator 42 into the rear end of dispensing head 38.

As shown, dispensing head 38 carries flap-opening means, gas cap-removal means and nozzle projection means, which are merely schematically illustrated in FIGURE 1 by the small circles on the face of dispensing head 38 and described in specific detail hereinafter. When dispensing head 38 is centered above island 32 as shown in FIGURE 1, it is in its neutral position with respect to each automobile.

Lateral and longitudinal vehicle positioning means 60 are constructed into the grade surface of the refueling station. A pressure sensing plate 74 detects that the automobile has advanced until the left front wheel rests on the plate.

Barrier gates 62, 64, 66 and 68 are mounted on barrier posts 70 and 72, respectively, at each end of island 32, and function to direct automobiles to the proper side of island 32. Gates 64 and 66 normally are open when no automobiles are being serviced, but close after an automobile drives in to be serviced. Gates 64 and 66 keep the automobile next in line for service from moving in close so that there is sufficient clearance for dispensing head 38 to operate properly. Gates 62 and 68 are raised when the servicing operation is complete.

Because of the automatic character of the process and device, the diversity, in terms of model year, manufacturer, model and body style, of the automobiles currently used by the motoring public, and the diversity of locations on such automobiles of the fuel tank inlet, it is necessary to locate each automobile with respect to the over-all apparatus prior to starting the refueling operation. The position of the automobile with respect to the apparatus may be approximate, being merely with a certain range of lateral and longitudinal distances from refernce points, or it may be fairly precise, to a tolerance of about plus or minus ¼ inch in each direction measured from appropriate reference positions on a car. One specific system for laterally and longitudinally positioning the automobile with respect to the over-all fuel dispensing apparatus is covered in co-pending application Serial No. 441,248, filed March 19, 1965, by I. Ginsburgh, E. Runes, H. J. Nebelsiek, and R. A. Sholts.

After positioning, the next step is identification of the automobile advantageously in terms of four primary criteria: model year, manufacturer, model and body style. These four criteria define each model of automobile. The vehicle indentification means is related to the hereinafter described dispensing head positioning means and is desirable in a fully automatic system in view of the diversity of fuel tank inlet locations on automobiles.

Various identification means may be employed, for example, photoelectric means, identification card, etc. However, a more general identification means has been designed whereby the customer manually signals to the apparatus the identification of his automobile by operating one or more buttons, toggle switches, or dials. In this embodiment, a console 36 positioned adjacent to the driver's seat is provided with buttons for each combination of automobile model year, manufacturer, model and body style designation, and the driver merely pushes the buttons which identify his automobile.

At some point a customer must inform the apparatus of the amount and grade of fuel (if more than one grade of fuel is dispensed) or blend of fuel he desires. The apparatus associated with receiving and implementing such information is called fuel determination means. The amount of fuel desired may be designated by a definite volume, or by instructing the apparatus to fill the fuel tank ("fill 'er up"). Selection of the grade of fuel is appropriately done by the customer actuating appropriate push buttons, toggle switches, or a dial. The console referred to above may be used to carry the necessary buttons or dial to be actuated by the customer as part of the fuel determination means.

As an optional feature, a start button may be provided as the last actuation step to be performed by the customer. Requiring the customer to perform a final starting actuation step is not, however, necessary for operability, inasmuch as the apparatus may be designed to continue automatically through completion of the refueling operation after identification of the car and actuation of the arrangement for payment. Certain novel features of the foregoing console selection system are described in co-pending application Serial No. 475,221, filed July 27, 1965, of I. Ginsburgh and L. T. Wright.

Before proceeding to characterize the movements of the apparatus necessary for the refueling operation and subsequent to the input of information identifying the vehicle model and the amount and quality of fuel desired, it is desirable to describe broadly how such movements are controlled. The above apparatus uses a numerical control system in executing the various diverse movements necessary for automatically refueling many models of automobiles. Numerical control denotes a method of controlling a machine automatically in which a complete set of instructions is given to the machine whereby all its movements follow such instructions in the execution of its intended operation. Such instructions are often called a stored program. Numerical control systems have been known heretofore and are finding increasing use where the same assembly of mechanical and electrical elements is to be used to execute either a diversity of operations or to act repetitively upon other objects which vary significantly in configuration or position, such as automatic machine tools. A characteristic of numerical control systems is their capability to make, or cause to be made, measurements, directly or indirectly, of the distances, either angular or linear or both, through which the mechanical elements of the machine have traversed, and to compare such measurements against instructions in the stored program in order to assure proper execution of the intended operation.

The dispensing head 38, which carries one or more fuel nozzles, is positioned adjacent the fuel tank inlet by guidance means responsive through the numerical control system to the automobile identification means. The guidance means comprises electrically, hydraulically or pneumatically operated prime movers which move the dispensing head laterally, longitudinally, vertically and angularly from its neutral position (to which it is returned after each refueling operation) to the fuel tank inlet. Electrical motors are preferred prime movers, because of the precision with which their movements and the movements of the mechanical elements driven by them may be measured and controlled. Chain and sprocket, various types of gears, and rack and pinion means are advantageously used as the mechanical linkage elements because of the minimal slippage in their movements. The dispensing head positioning means also comprises a continuously operating variable vertical positioning means hereinafter described.

From a known neutral position of the dispensing head and the known position of the reference planes of an automobile (e.g., a vertical plane through the rear axle and a vertical plane through the center of the left rear tire and perpendicular to the rear axle—the intersection of such planes forming a plumb line), the lateral and longitudinal distances through which the dispensing head must move to position it adjacent the fuel tank inlet are readily calculable for each model of automobile. This is because, for each such model, the lateral and longitudinal distances from the reference planes to the fuel tank inlet and to the dispensing head's neutral position are fixed distances.

However, the net vertical distance from the neutral position through which the dispensing head must move is the difference between the known and constant vertical elevation of the dispensing head in its neutral position above a datum plane, such as the grade level of the service station, and the variable vertical distance between the fuel tank inlet and such datum plane. The latter distance not only differs from one model of vehicle to another, but varies within each model because of varying loads carried by the vehicle, and such things as the condition of its suspension system and the extent of inflation of its tires. Furthermore, such distance is subject to continuous variation during refueling as a result of changes in the load carried by the automobile, such as by passengers shifting position, and as a result of the addition of the fuel itself.

Accordingly, as described in additional detail in co-pending application Serial No. 441,269, filed March 19, 1965, of I. Ginsburgh and L. T. Wright, it is necessary to measure continuously such variable vertical distance. This may be done by measuring with a vertically extendible probe, which is an element in the variable vertical position determining means, the distance from the datum plane to a preselected location on the vehicle, advantageously on the underside of the vehicle. Such location desirably has an essentially horizontal surface. Because there does not appear to be any single location on the underside of all automobiles which is suitable, it may be necessary to have a plurality of extendible probes, or a single movable probe which can be positioned for each refueling operation in response to the identification of the automobile, and then extended to measure the vertical distance. A single fixed probe may be used if it carries on its upper end a flat detecting member of relatively large surface area, on the order of 8 inches by 12 inches, disposed in a horizontal plane and substantially rigidly affixed to the probe. The size of such area may vary, depending upon the underside configuration of the various models of automobiles to be serviced.

In operation, the probe is extended upwardly, in response to an instruction, until its detecting member stops against an obstruction on the underside of the automobile. For each automobile, the relative location of the obstruction and the vertical distance from such obstruction to the fuel tank inlet will be determinable and constant. Hence, this latter vertical distance plus the distance the probe extends above the datum plane totals the vertical distance from such plane to the vertical tank inlet and is subtracted from the elevation of the dispensing head in its neutral position to determine the net vertical movement of the dispensing head necessary to bring it adjacent the fuel tank inlet. Unlike the dispensing head's longitudinal and lateral positioning means, the circuits for the variable vertical positioning means and other components of the dispensing head's vertical positioning means are continuously operating during the refueling operation, and the elevation of the dispensing head is responsively and continuously adjusted. The measurement of the distance through which the variable vertical positioning probe is extended may be performed by using linear variable differential transformers acting as transducers. The various vertical distance measurements are algebraically summed to hold the dispensing head vertically adjacent the fuel tank inlet. Alternatively, such measurements may be done by pneumatic, hydraulic or other suitable means, in which event it is desirable that the elevator's vertical prime moving means also be pneumatic.

The movement of the dispensing head need not be done solely by straight line movements, but may be so controlled by concurrent operation of a plurality of the elements comprising the dispenser head positioning means so as to trace a curve in space. The accuracy of positioning the dispensing head need only be about plus or minus ¼ inch along each axis. However, it is desirable that the movements of the dispensing head be known and ascertainable without slippage. Accordingly, motors are preferred prime movers relative to hydraulic or pneumatic means, and mechanical elements having fixed relationships, such as racks and pinions, gears, or sprocket chains are desirable mechanical linkages.

Fortunately, the precision of movement required of the dispensing head is well within the capability of engineering technology. At a tolerance of plus or minus ¼ inch, the necessary precision of movement is only about 1 part in 800 at its maximum, which is in the longitudinal direction, and in other directions is much less. This is in contrast to the precision of movement capability existing in numerically controlled machine tools, which is at least 1 part in 100,000. (In machine tool technology, this is often expressed as tolerance of plus or minus 0.001 inch over a 100 inch range of travel.)

After the dispensing head is properly oriented and in the desired position adjacent the fuel tank inlet, the flap-opening means is extended to open the flap. The flap-opening means may comprise a suitably manipulated magnet or vacuum cup, or a mechanical analog to the human arm and hand. We believe that the mechanical arm-hand analog is preferable from the standpoint of reliability, universal applicability and customer acceptance (which includes a number of factors, not the least of which is minimization of the risk of damage to the automobile).

The functional requirements of the flap-opening means are that it open the flap, hold it open during the refueling operation and thereafter close the flap. The flap-opening means described in greater detail hereinafter comprises a rigid arm shaft, a rotatable knuckle carried by the arm shaft, and a finger shaft, which is preferably rubber coated and tipped, rather like a person's fingertip, and slightly resilient, mounted on the knuckle. Such a flap-opening means requires the capability of five movements: travel of the arm shaft along its longitudinal axis and rotation about that axis, rotation of the knuckle about an axis perpendicular to the arm shaft, and travel of the finger shaft along its longitudinal axis and rotation about such axis. The axes of the two shafts are perpendicular to the axis of the knuckle.

In operation, the arm and finger are extended, together where appropriate and with appropriate rotation, in response to the stored program instructions until the tip of the finger engages the inside of a tab, or recess in the flap, or the back of the flap itself. The finger, knuckle and, if necessary, the arm are then manipulated to rotate the flap on its hinge until open, maintaining contact between the flap and the finger with light pressure. To close the flap, the finger is disengaged from contact, is moved around to the outer side of the flap and gently pushes it shut. Marring of metal surfaces is avoided by covering the tip with a soft material such as heavy felt or sponge rubber and by providing suitable torque limiting clutches in the driving linkages of the flap-opening means. Incorporating a spring into the finger provides resiliency and additional protection against marring metal surfaces, and minimizes the need for extreme accuracy in locating the opening notch or tab of the flap.

After the flap has been opened, the cap-opening means removes the gas cap and holds it sufficiently far away to permit the nozzle to be subsequently inserted into the fuel tank inlet. The cap-opening means must be able to locate the gas cap, hold it firmly, rotate the cap to disengage it from the fuel tank inlet pipe and move it out of the way. During the filling operation, the cap-opening means maintains the cap in substantially constant alignment relative to the inlet pipe, and thereafter replaces the cap on the inlet pipe and properly tightens it. The cap-opening means should compensate for the variation in the tightness with which gas caps are presented to the mechanism as a result of variations in hand tightening or loosening through mechanical vibration. Such variations manifest themselves in variations in the number of angular degrees through which a gas cap must be rotated before it first clears the engaging lip of the fuel tank inlet pipe and is in position to be withdrawn therefrom. Also, the cap-opening means should be designed to accommodate both the many types of gas caps which have a tab disposed along a diameter and in a plane perpendicular to the circular top face of a gas cap, as well as those types which do not have tabs. The accommodation of such tabs and the compensation for variations in tightness may be done by designing the cap-opening means to rotate about 360 angular degrees (or more) in removing the gas cap and then to rotate a comparable angular distance in the opposite direction in replacing the cap, but with the provision of a combination slip and torque limiting clutch in the linkage which permits the element holding the gas cap to stop rotating when the cap is either fully opened or closed, therefore avoiding damage to the automobile and simplifying the instructions in the stored program. The end of the cap-opening means which comes in contact with the gas cap is desirably provided with a soft non-scratching covering which in some embodiments may need to possess high-friction characteristics to prevent slippage when torque is applied.

The cap-opening means suitably comprises an extendible and retractable cap-opening arm carried by the dispensing head and having disposed at its end a set of manipulatable fingers, vacuum means, or, advantageously, a magnet adapted to grasp the cap and rotate it. Magnets may be used because all the gas caps used in recent years are made of steel, although sometimes coated with another metal. Any such magnet should be slotted to accommodate the tabs used on gas caps, and the contact surface of the magnet covered by a high-friction material, such as neoprene or a polyurethane, to prevent rotational slippage on gas caps which do not have a tab. Use of a magnetic principle in designing cap-opening means provides greater assurance against slippage and simplifies the design and complexity of the apparatus relative to the use of manipulated fingers or vacuum means.

Removing the loosened gas cap away from the fuel tank inlet is easily done by retracting the cap-opening arm. Alternatively, such arm may be designed to bend, rather like an elbow. In any event, the cap-opening means must have the capability of retaining the gas cap in substantially the same alignment with the fuel tank inlet as exists when the cap is removed from the inlet in order that the cap be in the proper plane and position to fit over the perimeter of the fuel tank inlet when being replaced, and thus assure ultimate engagement with the inlet's closure means upon being rotated. Immediate engagement with such closure means upon initial rotation is not necessary in embodiments having the rotational characteristics and torque limiting clutch described above.

The dispensing head may have a single nozzle to dispense several grades of fuel. Each grade of fuel is stored separately and connected to a manifold or a multi-position valve and thence to the single nozzle. Preferably, however, a separate nozzle is provided for each grade of fuel, and the proper nozzle is brought into use in accordance with the grade of fuel selected.

The nozzle projection means is carried by the dispensing head and has the capability of projecting the nozzle outwardly from the dispensing head and inserting it several inches, desirably about 6 to 8 inches, into the fuel tank inlet pipe. Optionally but desirably, the nozzle projection means also has the capability of conducting the fuel vapors as they arise from the inlet back to a vent system. It is also desirable to provide the nozzle projection means with seal means to prevent fuel from spilling out of the inlet in the event the rate of the pumping of the fuel causes fuel to back-up in the inlet pipe. This may be done by providing a deformable conically-shaped element made of hydrocarbon resistant material designed to fit snugly under moderate pressure around the perimeter of the inlet. It is desirable that the nozzle itself be flexible yet sturdy, in order that it can be thrust downward well into the inlet pipe without deforming metal and without having to add complexity to the stored program to accommodate the diverse shapes of the first 6 or 8 inches of pipe leading from the inlet's mouth toward the fuel tank. Protection for the tip of the nozzle when it is not in use may be provided by retracting the nozzle within a nozzle projection sleeve or arm.

In operation, the nozzle projection means simply extends the nozzle into the fuel tank inlet pipe and thereafter retracts it after the completion of the fuel pumping step. Generally, no rotational capability is required. The cut-off valve, which stops the flow of fuel in the event fuel backs up in the inlet pipe, may be disposed in the nozzle or in the nozzle projection arm, but is advantageously placed further up-stream from such arm, in the rear of the dispensing head. Such a cut-off valve should not only have the capability of automatically cutting off when the fuel backs up into the fuel tank inlet pipe, but also of automatically reopening if the fuel back-up is only temporary. Conventional shut-off valves now in use in gasoline pumps have the automatic cut-off capability, but require manual resetting. Such cut-off valve may be, and advantageously is, adapted to be the primary valve which controls the flow of fuel from the fuel storage tank.

Particular embodiments of the apparatus are set out in the annexed figures which form a part of this specification.

FIGURE 1 (previously described) is an isometric schematic overall view of refueling station equipped with the automatic dispensing equipment described herein.

FIGURE 2A is an isometric schematic view of the crane rails, bridge, carriage and the top of the elevator. FIGURE 2B is a schematic vertical sectional view of Section D—D of FIGURE 2A. FIGURE 2C is a vertical sectional view of Section E—E of FIGURE 2A. FIGURE 2D is a partial sectional view of Section F—F of FIGURE 2C.

FIGURE 3A is a schematic isometric close-up view of the dispensing head, its yoke and the lower portion of the elevator. FIGURE 3B is a schematic plan view of the cover (or "face") of the dispensing head.

FIGURE 4A is a partial sectional view of the forward portion of the dispensing head taken along its longitudinal axis at Section G—G of FIGURE 3A, and with the flap-opening knuckle and arm rotated 180 degrees for clarity of illustration. FIGURE 4B also is a partial sectional view of the forward portion of the dispensing head taken along its longitudinal axis at Section J—J of FIGURE 3A. (Section J—J is perpendicular to Section G—G.)

FIGURE 5 is a sectional view of the flap-opening knuckle taken in the plane formed by its rotational axis and the axis of its projection arm.

FIGURE 6 is a partial longitudinal sectional view of the cap-removal mechanism taken at Section H—H of FIGURE 3A, but with the curved outer end of such mechanism shown rotated 90 degrees for clarity of illustration.

FIGURE 7A is an elevational view of the power pack assembly illustrating the internal power transmission system. FIGURE 7B is a view of the power pack partly in section taken along lines L—L in FIGURE 7A.

FIGURE 8 is an enlarged detailed view of the gasoline control valve assembly partly in section.

Figure 10:
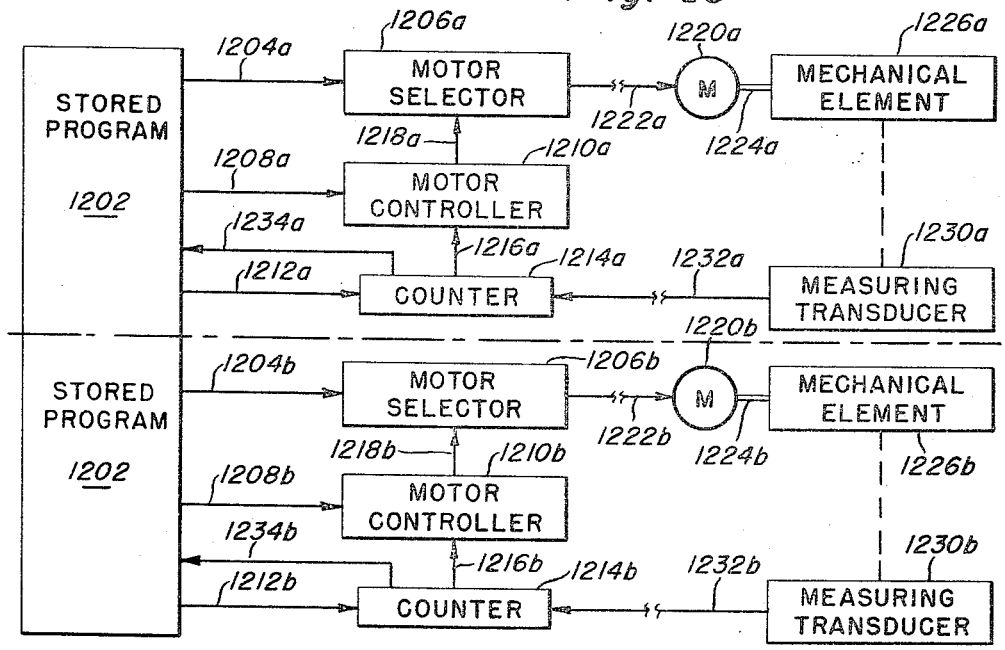

FIGURE 10 symbolically illustrates the logic circuitry of the numerical control system utilized in operating the automatic fuel dispensing system.

Throughout the figures, means for fastening (by screws, bolts, welds, etc.) together the various elements have been omitted for the sake of clarity and ease of understanding. Also, bearings have generally not been numbered, and in some instances not shown, their need and location being within the scope of established mechanical engineering skill.

After the necessary information has been supplied, dispensing head 38 is moved from its neutral position to a point adjacent the fuel tank inlet. This movement is effected by the combined operation of the elevator, bridge and carriage.

FIGURE 2A illustrates in greater detail and in an isometric view bridge 46, crane rails 48 and 50, carriage 44, and the top part of elevator 42. Elevator 42 is rotatably carried by carriage 44. The carriage is equipped with pinion wheels 402 and 404 which engage driving rack 406 affixed to one cross member of bridge 46. The weight of carriage 44 is borne by support wheels bearing on bridge 46 as illustrated by support wheels 403 and 405 and bridge rail 47. Carriage 44 is driven back and forth across the bridge by a positioning motor (not shown) responsive to transverse transducer 456. Such positioning motor is connected by a positive drive mechanism to the axle of wheels 402 and 403. Carriage 44 is further supported and moved on bridge 46 by support and pinion wheels (not shown) mounted on the axles of wheels 402 and 404, and which engage rail 49 and driving rack 408 of the bridge.

Bridge 46 traverses along crane rails 48 and 50 supported by bridge support wheels 409 and 411 and driven by pinion wheels 410 and 412 which engage driving rack 414 mounted on crane rail 50. Similar support wheels and pinion wheels (not shown) engage rail 48 and guide rack 416. Bridge 46 is driven along the crane by means of a positioning motor (not shown) which is responsive to longitudinal transducer 454 and which engages through a positive drive mechanism the axle of pinion wheel 410. Other mechanisms for moving the carriage and the bridge could be used such as a linear electric motor, screw and nut mechanism, hydraulic and pneumatic cylinders.

Before completing the description of FIGURE 2A, attention is directed to FIGURE 2B which is a schematic vertical sectional view of Section D—D of FIGURE 2A and which shows the engagement pinion wheel 410 with rack 414 and support wheel 409 of crane rail 50. Pinion wheels 402, 404, 410, 412 and their counterparts (not shown) disposed at the end of their axles are all constructed the same; likewise, support wheels 403, 405, 409 and 411 may all be constructed the same. Similarly, bridge racks 406 and 408 and crane rail racks 414 and 416 may be constructed the same.

Elevator 42 is rotatably supported by carriage 44. The explanation of the rotation, and the raising and lowering, of the elevator 42 is most easily done in connection with FIGURE 2C, which is a vertical sectional view of Section E—E of FIGURE 2A. Carriage 44 supports turntable 422 through X-bearing 424. The inner and outer races of X-bearing 424 are affixed, respectively, to turntable 422 and carriage 44. Elevator 42 is concentrically mounted within turntable 422 and is maintained in fixed rotational and vertical alignment therewith by key 426. Opposite key 426 is a rack 428 mounted on elevator 42 which engages the teeth of pinion 430 mounted on turntable 422.

Ring gear 432 mounted on turntable 422 engages pinion 434 driven by rotation motor 436 (shown in FIGURE 2C but not in FIGURE 2A) which is mounted on motor support 438 on carriage 44. Rotation transducer 452, which is directly connected to pinion 434, controls rotation of motor 436.

FIGURE 2C also depicts fuel conduits 446 and 448 (to which lead hoses 56 of FIGURE 1) and power conduit 450 disposed within elevator 42. For simplicity, these conduits are not shown in FIGURE 2A or FIGURE 2D.

FIGURE 2D is a partial horizontal view of Section F—F of FIGURE 2C. It shows elevator 42, turntable 422, key 426, rack 428, pinion 430, and vertical transducer 445. Pinion 430 is driven by dispensing head vertical positioning motor 440 and is supported within turntable 422 by bearings 442 and 444. Vertical transducer 445 is connected to pinion 430; the function of transducer 445 is described hereinafter.

In operation, elevator 42 is rotated by motor 436 turning pinion 434 which, through its engagement with gear ring 432 on turntable 422 and key 426, causes elevator 42 to rotate with respect to carriage 44. Elevator 42 is moved vertically as a result of vertical positioning motor 440 turning pinion 430 which engages rack 428 of the elevator, thereby causing the latter to move upward or downward depending upon the direction of rotation of pinion 430. Key 426 acts as a guide to maintain proper alignment.

FIGURE 3A is a schematic isometric close-up view of dispensing head 38, and FIGURE 3B is a schematic plan view of face 502 of the dispensing head.

The dispensing head comprises a cylindrical portion 504 within which are disposed the elements comprising the flap-opening mechanism, the cap-removal mechanism and the nozzle projection mechanisms. Cylindrical portion 504 is carried within a cylindrical shell ring 506 within which is disposed, as hereinafter described, means for rotating cylindrical body 504 about its longitudinal axis. Dispensing head 38 is carried by trunnions 508 (only one of which can be seen in FIGURE 3A) which are mounted in yoke 40. Trunnion rotation motor 512 is mounted on the side of yoke 40 and engages trunnion 508 through a worm gear (not shown), thus permitting rotation of dispensing head 38 around the axis of the trunnions. The tilt angle of the dispensing head is indicated to the control system by tilt angle transducer 524. Yoke 40 is affixed to the bottom portion of elevator 42. As shown in FIGURE 3A, yoke 40 has a semicircular configuration; however, the yoke may be designed in the shape of a U, thereby permitting a greater angle of rotation of dispensing head 38 around the axis of the trunnions. Fuel hoses 58 and power cable 59 exit from elevator 42 at its base and pass through the rear of power pack 523 mounted on the rearside of cylindrical body 504.

Extending outwardly from face 502 are flap-opening knuckle 514, flap finger 516, cap-remover arm 518 and fuel nozzles 520 and 522. These elements are further described in connection with the following sectional drawings.

FIGURE 4A is a partial sectional view taken along the longitudinal axis of the dispensing head at Section G—G of FIGURE 3A.

FIGURE 4A shows face 502, cylindrical body 504, shell ring 506, yoke 40, knuckle 514, flap finger 516 and nozzle arm 520. To the left in this drawing is dispensing head internal support partition 604.

The flap-opening mechanism appearing at the top of drawing 4A will be described first.

Threaded rotatable upper screw 606 is supported by bearings in a recess in dispensing head face 502 and by a bearing in internal partition 604. Guide 609 is disposed in the face and partition. The left-hand end 608 of screw 606 is splined and adopted to be mechanically connected to elements in the power pack section of the dispensing head, as shown in FIGURES 7A and 7B.

Four flat positioning motors 610, 612, 614 and 616 are mounted along a common rotational axis which is also advantageously the longitudinal axis of dispensing head 38. The motor housings are in fixed rotational alignment and supported by internally threaded nut 618 and bearing 620, which are carried by screw 606 and guide 609, respectively. The positioning motors have stators which are affixed to their respective motor housings and rotors (indicated by R) which are affixed to hereinafter described shafts. Transducers 611, 613, 615 and 617 indicate to the control system the angular position of the rotors of motors 610, 612, 614 and 616, respectively.

Finger projection arm 622 is a sturdy tube freely rotatable in and supported by bearing 624 in face 502. Affixed to arm 622 at its outer end is hereinafter described lower knuckle housing 626. At its inner end, finger projection arm 622 carries the rotor of finger projection arm motor 616. Upper knuckle rotation shaft 628 is a cylindrical tube disposed within arm 622 and is affixed at its inner end to the rotor of knuckle rotation motor 614. Finger extension shaft 630 is a cylindrical tube disposed within shaft 628 and affixed at its inner end to the rotor of finger extension motor 612. Finger rotation shaft 632 is a rod disposed within tube 630 and affixed at its inner end to the rotor of finger rotation motor 610. Shaft 632 is shown as a solid element, but could be hollow.

Elements 622, 628, 630 and 632 terminate at their outer end at or in knuckle 514 as further described in FIGURE 5. All such elements have as their longitudinal axes the common rotational axis of the four positioning motors. Additional bearings (not shown) to maintain proper alignment between such elements may be installed in the plane of rotation of rotor 616 or elsewhere as needed.

To extend the finger projection arm 622, screw 606 is rotated by driving means shown in FIGURE 7A causing the motor housings to traverse toward the inside surface 634 of dispensing head face 502. This causes the four positioning motors and the four concentrically aligned shafts to move transversely. Because of this movement, the space between the inside surface 634 and the right-hand side of motor 616 must be left free of obstruction. Retraction of the finger projection arm is done by simply reversing the direction of rotation of screw 606. The position of finger projection arm 622 is relayed to the control system by transducer 619.

Continuing with the description of the flap-opening mechanism, FIGURE 5 is a sectional view of knuckle 514 taken in the plane formed by its rotational axis and the axis of the finger projection arm 622. Finger projection arm 622 carries the knuckle and is affixed to the lower knckle housing 626. Finger shaft 701 passes through upper knuckle housing 702. The upper knuckle housing is rotatably affixed to the lower knuckle housing 626 by means of retaining ring 704. Radial and thrust bearing 706 permits relative motion between the upper and lower knuckle housings. The lower knuckle housing has a bottom cover 708, access port 710 and an access port cover 712. The upper knuckle housing has a top cover 714.

Upper knuckle rotation shaft 628 is affixed to gear 716 which engages, at line 718, the teeth of gear 720. Although gear 720 is shown cast as an integral part of upper knuckle housing 702, it is optionally a separate element and merely affixed to the upper knuckle housing.

Finger extension shaft 630 is affixed to gear 722 which engages gear 724. Shaft 726 is affixed to gear 724 and to gear 728, the latter engaging gear 730. Gear 730 is threadably engaged with finger shaft 701 and freely rotatably supported by bearing 734 in upper knuckle housing 702. Pin 736 fits into slot 738 on the hub of gear 730, thus permitting the gear to rotate, but restraining it from moving away from upper knuckle housing 702.

Finger rotation rod 632 is affixed to gear 740 which engages gear 742. Shaft 744, rotatably disposed within shaft 726, is affixed to gears 742 and 746, the latter being engaged with gear 748. The hub of gear 748 is freely rotatably supported by bearing 750 in a recess in upper knuckle housing 702. Pin 752, mounted within the upper knuckle housing, terminates in slot 754 cut into the hub of gear 748 and restrains such gear from moving away from the upper knuckle housing. The hub of gear 748 is provided with an internal key way 756. A counterpart key way is cut into finger shaft 701, and a key (not shown) prevents relative rotational movement between finger shaft 701 and gear 748, which is to say, rotation of gear 748 causes the finger shaft to rotate with it.

As shown in FIGURE 5, the hubs or collars on the various gears are shown as a single element with such gears. In practice, such hubs and collars could be integral with the shaft affixed to such gears, or they might be separate elements fastened with set screws to the shafts and gears. The gears are bevel gears and as shown have a 1:1 ratio. Alternative gear ratios may be used depending upon design considerations of the knuckle and of the prime movers and mechanical linkages driving the knuckle's gears.

Pins 736 and 752 may be replaced if desired by retaining rings or other mechanical equivalents.

Hub 760 of gear 728 is extended downwardly and is supported by upper knuckle housing 702 through bearing 762. Gear 746, shaft 744 and gear 742 are supported by gear 728 and its hub through bearing 764.

Rotation of the upper knuckle housing is done by motor 614 rotating upper knuckle rotation shaft 628, which rotates gear 716 which in turn rotates gear 720 affixed to the upper housing.

Extension and retraction of the finger are done by the operation of the finger projection arm, as described in connection with FIGURE 4A, and finger extension shaft 630. Extension and retraction of the finger shaft 701 is done by rotating, using motor 612, finger extension shaft 630 which operates through gears 722 and 724, shaft 726, and gears 728 and 730. Rotation of gear 730, which is internally threaded and threadably engaged with finger shaft 701 but restrained from other movement with finger shaft 701 by pin 736, transversely moves the finger shaft in a direction dependent upon the direction of rotation of the gear 730. Finger shaft 701 does not rotate with gear 730 because it is prevented from rotating by its keyed relationship to gear 748, which may be held in fixed position by use of motor 610 as a brake.

The rotation of finger shaft 701 is done by rotating, with motor 610, finger rotation shaft 632 which transmits its rotary motion through gears 740, 742 and 746 to gear 748. Since gear 748 is keyed to finger shaft 701, the rotation of the gear causes a corresponding rotation of the shaft. Finger shaft 701 and its rotational gear train may be designed for any desired number of degrees of rotation in either direction, illustratively, 180 or 360 degrees. It is to be noted that each 180 degrees of rotation of finger shaft 701 by gear 748 causes the finger shaft to move longitudinally a distance equal to ½ the pitch of the threads engaging the hub of gear 730. To compensate for this, the stored program may be written to use motor 612 to concurrently or sequentially rotate shaft 630 an amount sufficient to compensate.

Returning now to FIGURE 4A for the description of the finger, threaded finger shaft 701 is shown passing through upper knuckle housing 702. At the end of finger shaft 701, there is a fixed stiff helical spring 636 to which is mounted a curved metal strip 638 covered with a non-scratching material 640. The pointed tip of strip 638 is that portion of the mechanism which contacts the flap during the opening operation.

After the flap has been opened, the cap-remover arm is projected outwardly to remove the cap. FIGURE 6 is a partial longitudinal section of the cap-removal mechanism taken at Section H—H but also showing the curvature of the cap-remover arm) of FIGURE 3B. Threaded guide screw 802 is rotatably disposed in dispensing head face 502 and extends through support partition 604, ending in spline configuration 803 adapted to be engaged with its hereinafter described driving means. Cap-remover projection arm 804 is a hollow tube, slidably extended through dispensing head face 502, and to it is affixed internally threaded nut 806 which threadably engages screw 802. Inside cap-remover projection arm 804 is cap-remover torque tube 808 which is maintained in concentric alignment with cap-remover arm 804 by means of bearing 810. Torque tube 808 is rotatably extended through support partition 604 and terminates in a male spline 811 adapted for engagement with its driving means shown in FIGURE 7. Concentrically mounted within torque tube 808 is splined shaft 812 which is held in fixed rotational alignment with torque tube 808 by means of the latter's female spline 814. Guide 807 is disposed between the dispensing head face 502 and support partition 604; bearing 809 is mounted on projection arm 804 and slideably engaged with guide 807.

The right-hand side of splined shaft 812 carries slip and torque limiting clutch 816. The right-hand portion of cap-remover arm 804 comprises a section 818 of reduced cross-sectional area. Within such section is disposed flexible shaft 820 which is connected through shaft 822 to clutch 816. Bearings 824 and 826 are used to maintain proper alignment. At its outer end, flexible shaft 820 is affixed to solid shaft 828 which terminates in a relieved male spline 829 which fits into a female splined recess 830 in magnet 832. Flexibility to accommodate minor angular deviations when the cap-remover is contacted with a gas cap is provided by coiled spring 834 held in place by collar 836 affixed to shaft 828. Permanent magnet 832 has a slot 838 and is covered with a non-abrasive, high surface friction material, such as rubber or polyurethane, 840.

In operation, cap-remover arm 804 is projected forwardly by rotation of screw 802 until nut 806 contacts forward motion limit swich 842. During projection, torque tube 808 does not move, but splined shaft 812 is pulled along because of its mechanical linkage with section 818 and clutch 816. Dispensing head 38 (FIGURE 3A) is positioned so that the gas cap is contacted by the face of magnet 832 a short time before limit switch 842 arrests forward motion of arm 804. Slight variations in the location of the gas cap are accommodated by the travel permitted by the play between magnet 832 and spline 829. Limit switch 842 also starts rotation of torque tube 808. Rotational motion of tube 808 is transmitted through splined shaft 812 to magnet 832, thus permitting the magnet to first engage any tab on a gas cap, and thereafter to disengage the gas cap from the closure means on the fuel tank inlet pipe. Torque limiting clutch 816 prevents damage to the fuel tank inlet pipe or the cap-removal mechanism by permitting slippage if and when the gas cap has been rotated against a stop means usually existing on fuel tank inlet pipes.

After the gas cap has been disengaged from the closure means, cap-removal arm 804 is retracted by rotating screw 802 in a reverse direction, thus pulling the gas cap sufficiently far away to permit introduction of a nozzle into the inlet pipe. During this operation, the rotational alignment of torque tube 808 and splined shaft 812 are not changed.

The gas cap is replaced by projecting cap-removal arm 804 as previously described, tightening the gas cap on the pipe by means of rotating torque tube 808 in the opposite direction from the removal action, and thereafter retracting cap-removal arm 804. The rearward motion of arm 804 is stopped by limit switch 844 cutting power to the drive mechanism in the power pack hereinafter described.

Reference is again made to FIGURE 4A, this time for a description of nozzle projection mechanism 520. Primary nozzle projection arm 642 is slideably disposed through and carried by dispensing head cover 502. It is a straight tube throughout its left-hand (or inner) end, and partially curved towards its right-hand or outer end. Secondary nozzle projection arm 644 is telescopically disposed within primary projection arm 642. Vent tube 646 is telescopically disposed within secondary projection arm 644, and passes through and is carried by internal partition 604.

Fixed fuel conduit 648 is concentrically disposed within vent tube 646 and extends, as shown on FIGURE 4A, to the left through the hereinafter described power pack housing to connect with a gasoline control valve assembly hereinafter described. Movable fuel conduit 650 is concentrically disposed within outer fuel conduit 648, and at its right-hand end is affixed to and carried by collar 652, which in turn is affixed to the inside of secondary projection arm 644 by first spider 654. Passage of fuel through the annular space between fuel conduits 648 and 650 is prevented by slideable seal means 656, which also acts as a support for the left-hand end of inner fuel conduit 650. (An alternative embodiment is to make fuel conduits 648 and 650 telescopic, with a tightness of fit and enough overlap to prevent leakage of fuel between the two conduits.)

Second spider 658 and third spider 660 are affixed to the inside of primary nozzle projection arm 642 and carry nozzle guide 662. Disposed within nozzle guide 662 is fuel nozzle 664, which comprises a flexible center portion, and terminating in a mouth 666. Nozzle 664 connects to and is primarily carried by collar 652, and is not supported at its mouth.

Sniffer tube 668 extends from its open end 670 located on the side of and adjacent mouth 666 of fuel nozzle 664 back through the nozzle, through collar 652 and, in the form of an easily extendible helical coil 671, back through the annular space between vent tube 646 and fixed fuel conduit 648. It terminates at its left end (not shown on FIGURE 4A) in the automatic fuel flow control means. Except for its helically coiled portion, sniffer tube 668 is similar in construction and disposition at mouth 666 of the fuel nozzle 664 to conventionally used sniffer tubes; however, the automatic fuel control means to which it leads may be the same or different from such means now in use.

Ring gasket 672 is carried by collar 674 which in turn is carried by outer projection arm 642. Seal 672 is in the shape of a ring, with an inwardly sloping outer surface. It is made of an oil-resistant, easily deformable material (e.g., sponge neoprene rubber) in order that it form a fluid-tight seal around the mouth of the fuel tank inlet. Spring 676 provides sufficient resiliency to permit seal 672 to accommodate slight inaccuracies in the angle at which it is presented to the mouth of the fuel tank inlet, and further provides sufficient tension to maintain the alignment between collar 674 and outer projection arm 642. Collar seal 678 prevents the escape of fuel which may back-up into the primary projection arm 642 during the fueling operation.

Before describing the movements of the nozzle projection mechanism, it is necessary to refer to FIGURE 4B, which is a partial sectional view of the outer portion of such mechanism taken along the longitudinal axis of dispensing head 38 at Section J—J of FIGURE 3A. (The section shown in FIGURE 4B is taken perpendicular to the section shown in FIGURE 4A.) Externally threaded rotatable screw 679 is supported by a bearing in a recess in dispensing head face 502 and by a bearing in internal partition 604. Screw 679 is provided with a male spline 680 at its left-hand driven end. Internally threaded nut 681 engages the threads of screw 679 and is affixed to primary projection arm 642.

Guide and torque spline 682 is rotatably supported by a bearing in a recess in dispensing head cover 502 and by a bearing at the point where it passes through internal partition 604. The male spline configuration extends along almost the entire length of guide spline 682 between cover 502 and partition 604. The left-hand end 683 of spline 682 extends into the power pack section at the rear of the dispensing head where it engages its driving means. Secondary projection arm torque tube 684 is externally threaded, and is provided with a female-splined internal collar 698 (here shown integral with the torque tube) at the forward end; this collar slidably engages spline 682 and holds torque tube 684 in rotational alignment with spline 682. At the left-hand end of the torque tube, bearing 685 is carried by yoke 696 and held in the yoke 696 by retaining pin 697. Yoke 696 is mounted on secondary nozzle projection arm 644. Internally threaded nut 686 is threadably engaged with the outside threads of tube 684 and is affixed to primary nozzle projection arm 642. (Nuts 681 and 686 are separate elements, despite the fact that they are shown in vertical alignment in FIGURE 4B.)

Referring now to both FIGURES 4A and 4B. When refueling a car the nozzle is projected into the fuel tank inlet pipe in response to the stored program instructions for the model of automobile being refueled. Primary projection arm 642 is first extended by the rotation of screw 679, the rotation of which, acting through nut 681, outwardly projects arm 642 until ring seal 672 encounters and fits over the mouth of the fuel tank inlet pipe. At the same time, secondary projection arm 644 is carried outwardly (that is, to the right) an equal distance as a result of the mechanical linkage formed between it and primary projection arm 642 by nut 686, torque tube 684 (sliding along spline 682) and bearing 685. All of the elements (spider 654, collar 652, fuel nozzle 664, sniffer tube 668, and movable conduit 650) are carried by the secondary projection arm 644, and all the elements (second spider 658, third spider 660, nozzle guide 662 and the extremity elements, Nos. 672, 674, 676 and 678) are carried by the primary projection arm 642 and likewise projected forward concurrently. Vent tube 646 does not project.

Dispensing head 38 (FIGURE 3A) is so positioned that after ring gasket 672 encounters and fits over the fuel tank inlet pipe mouth, forward motion limit switch 669 has stopped the motion of primary projection arm 642 by disengaging screw 679 from its driving means. Next, spline 682 is rotationally engaged with its driving means. Spline 682 causes torque tube 684 to rotate and, because of its threaded engagement with nut 686, to move outwardly. Secondary projection arm 644 telescopically slides between vent tube 646 and nonstationary primary projection arm 642 until forward movement limit switch 673 stops arm 644, thus projecting mouth 666 of nozzle 664 several inches (illustratively, six to eight inches) into the fuel tank inlet pipe.

Upon completion of the foregoing projection, pumping of fuel is automatically started. After the required quantity of fuel has been pumped, the nozzle projection mechanism is retracted by reversing the projection procedure. However, in this case rear movement limit switches 675 and 677 stop the movement of arms 644 and 642, respectively.

Although the foregoing description was in respect of only one of the two nozzle projection mechanisms, its counterpart mechanism is constructed and operated in the same manner; they are, in effect, "twins."

The arrangement between yoke 40, shell ring 506 and dispensing head body 504 is depicted at the bottom of FIGURE 4A. Trunnion 508 is rotatably supported by means of bearing 687 held in place by collar 688, and is affixed to shell ring 506. (As described previously, one trunnion is rotated by trunnion motor 512 by means of a worm gear arrangement, not shown in FIGURE 4A. Rotation of the trunnions rotates ("tilts") dispensing head 38 around the axis of the trunnions.) Shell ring 506 encircles dispensing head body 504, and rotatably carries it by means of X-bearing 689, the split inner races 690 of which are affixed to body 504, and the outer race of which is carried through mounting support 691 by shell ring 506. Ring gear 692 is affixed to dispensing head body 504, and engages pinion gear 693 driven by dispensing head rotation motor 694 which is supported by means not shown by shell ring 506. Actuation of motor 694 causes dispensing head 38 to rotate around its longitudinal axis, and the angle of rotation of head 38 is indicated to the control system by transducer 695.

It will be noted that dispensing head 38 is rotatable around three axes. It is rotated around a vertical axis by operation of elevator rotation motor 436 (FIGURE 2C). This capability is required to present the dispensing head to fuel tank inlets which do not point toward the left side of an automobile. The dispensing head may also be rotated around the axis of the trunnions, using trunnion rotation motor 512 (FIGURE 3A), in order to accommodate the varying angles (relative to a horizontal plane) at which fuel tank inlets are positioned; generally, such inlets point sharply upward. Finally, the dispensing head is rotatable around its own longitudinal axis by operation of dispensing head rotation motor 694. This capability may at times be needed to present the cap-removal mechanism in proper position relative to the fuel tank inlet, and is needed after the gas cap has been removed and while the flap-opening mechanism is holding the flap open in order to present one of the nozzle projection mechanisms in proper position. It is because of the need to rotate the dispensing head around its longitudinal axis while concurrently holding open the flap that the longitudinal axis of finger projection arm 622 is designed to coincide with the longitudinal axis of dispensing head 38. The flap may be held open, and knuckle 514 and flap-opening finger 516 held stationary in space, by rotating finger projection arm 622 in a direction opposite to and at the same angular speed as the longitudinal rotation of dispensing head 38.

FIGURES 7A and 7B are views of the previously mentioned power pack assembly 523; this assembly provides power to project and retract the fuel nozzles, the cap-remover and the flap-opening mechanism and to rotate the cap-remover magnet on the dispensing head 38. FIGURE 7A is an elevational view of the power pack assembly depicting the internal power transmission system. FIGURE 7B is a view of the power pack assembly partly in section taken along line LL in FIGURE 7A. As previously shown in FIGURE 3A, the power pack assembly 523 is mounted on the back of head 38. Preferably, the power pack assembly 523 is a separate unit so that it may be easily removed for any needed servicing. In operative position, the front wall 958 of the power pack assembly 523 is mounted adjacent to the dispensing head internal support partition 604 (FIGURE 4A).

Referring to both FIGURES 7A and 7B, positioning motor 902 turns drive shaft 904. Drive chain 906 is fitted over drive chain sprocket 905, mounted on shaft 904, and drive chain sprockets 910, 912 and 914. Sprockets 910, 912 and 914 are coupled to electromagnetic clutches 916, 918 and 920, respectively, which drive internal splines 922, 924 and 926, respectively. Drive chain 908 is fitted over a second drive chain sprocket (not shown), mounted on shaft 904, and drive chain sprockets 928, 930 and 932. Sprockets 928, 930 and 932 are coupled to electromagnetic clutches 934, 936 and 938, respectively, which drive internal splines 940, 942 and 944, respectively.

Spline 926 receives external spline 680 (FIGURE 4B) on primary nozzle projection arm 642. Spline 922 similarly receives the external spline on a second primary nozzle projection arm which is a component of fuel nozzle 522 shown in FIGURE 3A. Spline 924 drives external spline 608 (FIGURE 4A) of the flap-opener projection arm 622. Spline 944 drives external spline 683 (FIGURE 4B) on the secondary nozzle projection arm 644, and spline 940 drives a second secondary nozzle projection arm (not shown) of fuel nozzle 522. Spline 942 drives spline 803 (FIGURE 6) on the cap-remover arm. These splines are driven by their corresponding electromagnetic clutches in response to signals from the control system.

A second positioning motor 950 drives pinion 952 and gear 954. Gear 954 is connected to internal spline 956 which drives spline 811 of FIGURE 6 to rotate the cap-remover magnet 832. Rotation is controlled by switching motor 950 on and off in response to instructions from the program.

Passageway 962 is an extension of vent tube 646 of fuel nozzle 520 and also receives fixed fuel conduit 648 (FIGURE 4A), which extends through the passageway and connects with the fuel control assembly next to be described. The annular space between the conduit 648 and the walls of passageway 962 conduct the fuel vapors from the fueling operation and pass them to the atmosphere at the rear of the power pack assembly 523. Alternatively, the vapors can be passed to a vapor recovery system. Power control valve assembly 1000, which will be described in detail in FIGURE 8, is mounted on the back of the power pack assembly with mounting lugs 1002. A second fuel control valve (not shown) is also mounted on the back of the assembly 523 in register with passageway 960.

FIGURE 8 is a detailed view partly in section of fuel control valve assembly 1000. It mounts on the back of power pack assembly 523 by means of mounting lugs 1002. A liquid tight coupling 1004 connects the housing 1006 of assembly 1000 to the fixed fuel conduit 648 (FIGURE 4A).

Valve assembly 1000 is shown in the closed position. Plate 1012 and magnetic plunger 1016, which are firmly joined together, obstruct orifice 1008. The action of spring 1010 causes plate 1012 to compress gasket 1014 and achieve a leakproof fit.

Valve assembly 1000 is electrically operated. When electric power is applied to coil 1018, magnetic plunger 1016 moves to the left in FIGURE 8. Movement of plunger 1016 and plate 1012 to the left unblocks the orifice, thereby opening the valve.

When control valve assembly 1000 is in the open position fuel enters the control valve through inlet connection 1007, flows through the space between plate 1012 and gasket 1014, passes through control orifice 1008 and through coupling 1004 into fixed fuel conduit 648. The control valve is closed by removing power to coil 1018. This occurs when a preselected quantity of fuel has been delivered to the automobile being refueled or the fuel tank has been filled, whichever event the driver has selected.

Valve assembly 1000 closes automatically when the fuel tank of the automobile is full by sensing with sniffer tube 668 that the fuel has risen to the level of the open end of the filling nozzle. As shown in FIGURE 4A, sniffer tube 668 extends from its open end 670 located on the side of and adjacent mouth 666 at fuel nozzle 664 back through the nozzle and connects with helical section 671 which in turn connects with front sniffer tube extension 1020 of valve assembly 1000. Extension 1020 connects through passage 1022 to port 1024 in the control orifice 1008. When fuel flows through the control orifices, the pressure at port 1024 is below atmospheric. Because of the lower pressure, air and other gases from within the fuel tank inlet are drawn into the flowing fuel through port 1024, connecting passage 1022, sniffer tube extension 1020, helical sniffer tube 671, nozzle sniffer tube 668 and the open end 670 of sniffer tube 668. If the fuel level in the fuel tank inlet is high enough so that fuel foam obstructs the open end of sniffer tube 670, air and gases are no longer drawn into the sniffer tube assembly. The lower pressure caused by the flow of fuel at orifice 1008 creates a vacuum in back sniffer tube extension 1028 and evacuates first diaphragm chamber 1026. As first diaphragm chamber 1026 is evacuated, diaphragm 1030, which is held extended by spring 1032, is drawn into chamber 1026 forcing small permanent magnet 1036 (affixed to spring 1032) to the left. As magnet 1036 moves to the left, it exerts magnetic pull on contact 1038 of hermetically sealed reed switch 1040 and ultimately pulls the reed switch contacts apart. The opening of the reed switch stops the flow of current to coil 1013 which releases the magnetic plunger 1016 and seats plate 1012 against the gasket 1014 thereby closing the valve and stopping the flow of fuel. In the event that fuel or foam is only temporarily blocking open end 670 of the sniffer tube 668 due, for example, to splashing of the fuel, the subsequent unblocking of the open end of sniffer tube 670 permits air to flow into the sniffer tube assembly and repressure diaphragm chamber 1026. This permits spring 1032 to push magnet 1036 to the right and the closing of reed switch 1040 permits the coil 1018 to again open the control valve and permits fuel to flow. This reopening prevents premature termination of the refueling operation due to temporary blocking of the open end of the sniffer tube 670 and can be repeated as many times as necessary.

When the level of fuel in the automobile tank or inlet pipe reaches the open end of the sniffer tube 670, the open end 670 of the sniffer tube 668 is completely blocked and the components of the fuel control valve function as heretofore described under a temporary blocking of the open end of the sniffer tube 670. However, this time the open end of the sniffer tube is not unblocked and the valve must not reopen. The reduced pressure in diaphragm chamber 1026 slowly evacuates second diaphragm chamber 1042 through the very small orifice 1044. The resultant action of spring 1046, magnet 1048 and diaphragm 1052 of chamber 1042 is the same as the action of the identical components of chamber 1026. This time one of the contacts 1054 of hermetically sealed latching-type reed switch 1056 is pulled open. The open contacts 1054 remain open and keep the control valve closed during the rest of the operation. A second pair of contacts 1058, mechanically coupled to contacts 1054, can be used to indicate to the control system that reed switch 1056 is open and therefore the automobile's fuel tank is full. A reset coil 1060 is used to unlatch reed switch 1056 at the start of the next filling operation.

A rear cover cap 1062 permits access to the two diaphragm chambers.

In this embodiment, two separate fuel valves and nozzle assemblies are shown. A single valve that can select either type of fuel and deliver it through one nozzle assembly can also be utilized.

Earlier in the specification reference was made to the variable vertical vehicle position determining means, which is required because the vertical distance above grade of the fuel tank inlet varies from automobile to automobile, even though they may be identical models. The variation in such distance results from variations in the condition of the vehicle's tires and rear springs and the loads (passengers, luggage and fuel) on the tires and springs. Because the addition of the fuel alone will alter such distance during the refueling operation, it is necessary, as previously described, to provide for initially sensing the elevation of each vehicle above a known datum plane, in order that the dispensing head be correctly positioned initially relative to the mouth of the fuel tank inlet, and further to provide means for continuously sensing such elevation during the refueling operation, and adjusting the vertical position of the dispensing head in response thereto.

Figure 9:
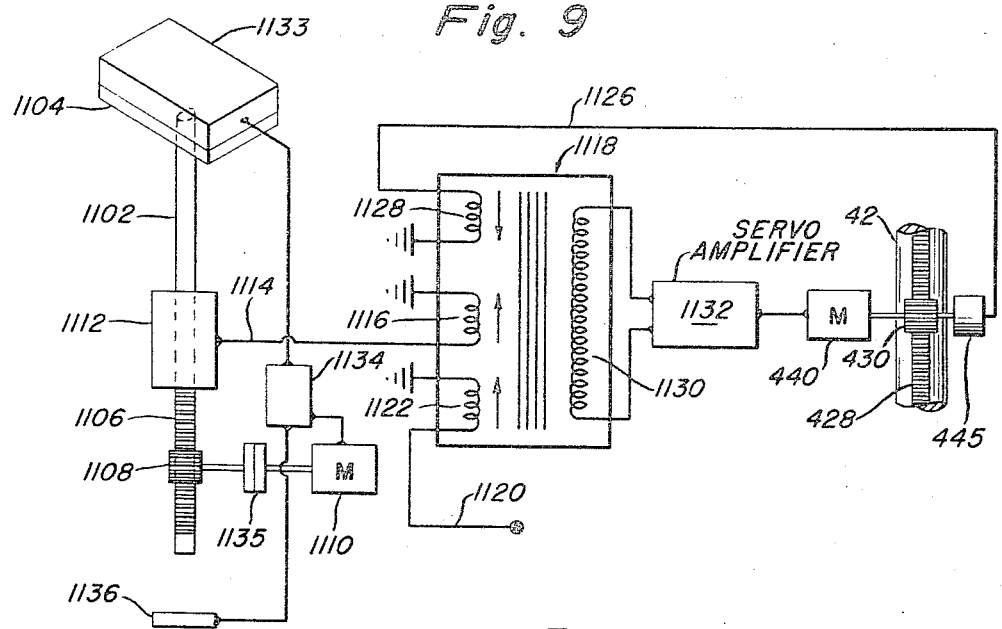
FIGURE 9 is a schematic diagram of the mechanical elements and circuitry of the variable vertical position determining means.

The apparatus for such sensing was earlier described. The electrical circuitry and the primary mechanical elements comprising the variable verticle position determining means are shown schematically in FIGURE 9. Variable vertical position determining probe 1102 carries a horizontal support plate 1104 (shown isometrically) with a pressure sensitive switch 1133 on its upper surface. Pressure sensitive switch 1133 detects the pressure of any contact made on its upper surface. In operation, plate 1104 and switch 1133 are raised by rack 1106 until switch 1133 contacts some point on the underside of the automobile. Rack 1106 is driven through pinion 1108 by vertical probe motor 1110. Contact of switch 1133 with the underside of the automobile signals motor control relay 1134 to stop motor 1110. Friction clutch 1135 allows probe 1102 to descend as the automobile descends with any increase in its load. Variable vertical position determining probe transducer 1112 (which is a linear variable differential transformer acting as a transducer) is disposed around probe 1102 and adapted to continuously electrically signal (alternating current) the distance such probe is extended upwardly from a datum plane. Such signal is transmitted through line 1114 to first primary winding 1116 of transformer 1118.

The vertical distance between the mouth of the fuel tank inlet and the obstructing point on the underside of the vehicle (which point is sensed by probe 1102) is constant for each model of vehicle, and is represented by a constant intensity electrical signal generated (by means not shown) upon instruction by the stored program for such model and transmitted through line 1120 to second primary winding 1122.

Elevator-elevation measuring transducer 445 is disposed adjacent elevator 42 and is adapted to measure the vertical distance between the reference datum plane and the axis of the trunnions of yoke 40, and to transmit through line 1126 a signal proportioned to such distance. The signal transmitted through line 1126 leads to third primary winding 1128.

(Elevator transducer 445 measures the distance to the trunnion axis, rather than to some point on dispensing head cover 502, because the dispensing head is rotatable about the trunnion axis, and, hence, the center of cover 502 may, and often will, be above or below such axis. To accommodate the latter event, the magnitude of the signal transmitted to primary winding 1122 is varied by the stored program as the dispensing head is so rotated, or is automatically varied by electro-mechanical means (not shown) in response to the dispensing head's rotation.)

Secondary winding 1130 of transformer 1118 leads to servo-amplifier 1132, which is continuously actuated and which actuates dispensing head vertical positioning motor 440, which in turn drives pinion 430 engaged in rack 428 of elevator 42. The direction of rotation of motor 440 (and, thus, the direction of vertical movement of elevator 42) depends upon the relative magnitude of the sum of the signals impressed upon first primary winding 1116 and second primary winding 1122, versus the signal impressed on third primary winding 1128. If the latter is greater than such sum, the axis of the trunnions is above the mouth of the fuel tank inlet; hence, the signal from secondary winding 1130 to servo-amplifier 1132 cause motor 440 to turn in a manner to lower the elevator 42, but if the latter is less than such sum, motor 440 is rotated in the opposite direction, thus raising elevator 42. When the signal to winding 1128 equals the sum of the signals to windings 1116 and 1122, and this is the desired condition, indicating as it does that the axis of the trunnions and, hence, the dispensing head is in the correct position, no signal is transmitted from secondary winding 1130, and motor 440 is not rotated.

After the completion of the refueling operation, motor 1110 lowers probe 1102 until it contacts limit switch 1136, which signals motor control relay 1134 to stop motor 1110, leaving probe 1102 in stand-by position.

Although the technique of using systems of stored programs and numerical control to operate machinery is known, it is believed appropriate to outline broadly and in conjunction with a schematic diagram the logic (as that word is used in the relevant art) of a numerical control system which may be used in operating the automatic refueling system described in this specification. FIGURE 10 symbolically illustrates the principal elements and circuitry of such logic. Two parallel arrangements are shown, one on each side of the horizontal dashed line, which provides the capability of concurrently operating two numerically controlled mechanical elements. For convenience and brevity of description, each parallel box and line on FIGURE 10 will bear the same numeral, but be differentiated by letter suffixes. The use of two such arrangements is optional; one suffices for operability, and more than two merely provide for the concurrent operation of an additional mechanical element for each additional parallel arrangement.

Stored program 1202 is electrically connected through line 1204a to motor selector 1206a; through line 1208a to motor controller 1210a; and through line 1212a to counter 1214a. Counter 1214a is connected through line 1216a to motor controller 1210a, which in turn is connected through line 1218a to motor selector 1206a. (The arrows on the electrical lines indicate the direction that the signal is being transmitted.)

Motor selector 1206a is connected to the desired motor 1220a through line 1222a, the latter being shown broken, because the same motor selector will be connected sequentially through an appropriate switch (not shown) to various motors. Motor 1220a is mechanically linked through linkage 1224a (illustratively, a rack and pinion, worm gear, chain and sprocket, spline, etc.) to the mechanical element 1226a (illustratively, the bridge, carriage, elevator, outer nozzle projection arm, etc.) driven by such motor.

The distance, linear or angular, through which mechanical element 1126a is moved is measured electromagnetically (as illustrated by the dashed line) by measuring transducer 1230a, which transmits its signal through line 1232a to counter 1214a. The counter in turn signals back to the stored program through line 1234a that the act instructed by the stored program has been executed, and that the logic system is ready for the next instruction.

The signal transmitted by the stored program over line 1204a determines the motor to be actuated; the signal transmitted over line 1208a determines the direction of rotation (clockwise or counterclockwise) of such motor; and the signal transmitted over line 1212a determines the angular distance such motor is to be rotated, which, of course, determines the distance, angular or linear, that its driven mechanical element 1226a is to move. The information signalled into motor controller 1210a is transmitted through line 1218a and motor selector 1206a to motor 1220a.

The signals transmitted by counter 1214a to motor 1220a.

The signals transmitted by counter 1214a over line 1216a not only start and stop motor 1220a, but also slow it down, in response to the signal from measuring transducer 1230a transmitted over line 1232a indicating, when compared to the total desired distance signal received from the stored program over line 1212a, that the desired movement of mechanical element 1226a is almost complete. This avoids undesirable over-run. Accordingly, counter 1214a desirably has pre-set capability and also warning capability.

Suitable counters, motor controllers and motor selectors may be electromechanical subassemblies which currently are commercially available.

Inasmuch as a plurality of clutches, all transmitting power from one motor, may be used to reduce the number of motors required, the logic system depicted by FIGURE 10 may be expanded by interposing a clutch, as part of mechanical linkage 1224, between motor 1220 and mechanical element 1226, such clutch to be designated by a clutch selector (not shown) operated by electromechanical means upon signal from stored program 1202.

Illustrations of instances of the use of parallel logic circuits capable of simultaneously operating two mechanical elements are the concurrent traversing of bridge 46 along crane rails 48 and 50, and of carriage 44 along the bridge; the aforesaid concurrent rotation of dispensing head 38 while holding knuckle 514 stationary in space by the rotation of finger projection arm 622. However, the capability for plural concurrent operation is not essential for operability, even in the last-named instance of the preceding sentence, because in such instance the operational requirements may be satisfied (at the cost of additional time of operation and a lengthier stored program) by sequential operation in small alternate increments.

The foregoing description of a preferred embodiment of the present invention has been presented for the purpose of exemplification. From the foregoing description, various alterations and modifications in the details of construction will become apparent to one having ordinary skill in the art, and it will be understood that such modifications and alterations fall within the spirit and scope of the appended claims.

Having thus described the invention, what is claimed is:

1. Apparatus for dispensing a fluid from storage into a stationary tank provided with an inlet, which apparatus comprises:
   a support member;
   a movable dispensing head member connected to said support member;
   fluid supply means connected to said head member;
   multidirectional positioning means connected to said head member for moving said head member from a reference point to a known location corresponding to the inlet of said stationary tank;
   nozzle means positioned in said head member and connected to said fluid supply means, said nozzle means being extendible from and retractable into said head member;
   nozzle projection means connected to said nozzle means for alternately extending said nozzle means outwardly from said head member when positioned at said known location and retracting said nozzle means into said head member;
   valve means mounted within said dispensing head and connected to said fluid supply means for controlling the flow of fluid therethrough said valve means being adaptable for response to the liquid level in said tank; and
   control means connected to said valve means for opening said valve means when said nozzle is extended from said head member and for subsequently closing said valve means.

2. The apparatus of claim 1 wherein said positioning means moves said head member vertically, longitudinally and laterally with respect to said known location.

3. The apparatus of claim 1 wherein said head member is rotatable about three axes.

4. The apparatus of claim 3 further including motor means connected to said head member for rotating said head member.

5. The apparatus of claim 1 further including a flap-opening means connected to said head member for opening and closing a flap over said tank inlet.

6. The apparatus of claim 5 wherein said flap-opening means comprises an arm member slidably extending through said head member.

7. The apparatus of claim 5 wherein said flap-opening means comprises an arm member positioned in said head member and extendible therefrom, a knuckle member at the outboard end of said arm and a finger member rotatably connected to said arm member by said knuckle member.

8. The apparatus of claim 7 wherein said finger member is extendible from said knuckle member and rotatable in respect of said head member.

9. The apparatus of claim 1 further including a cap-removal means connected to said head member for removing a cap on said tank inlet.

10. The apparatus of claim 9 wherein said cap-removal means comprises an arm member slidably extending through said head member and provided at its outboard end with a cap-engaging means, said cap-engaging means being rotatable in said head member.

11. The apparatus of claim 10 wherein said cap-removal means is provided with a torque limiting clutch to limit the torque applied to said cap by said cap-engaging means.

12. The apparatus of claim 1 further including a vent tube attached to said nozzle means for conducting vapors from said tank during the dispensing operation.

13. The apparatus of claim 1 further including seal means adjacent the outboard end of said nozzle means for sealingly engaging with said tank inlet to prevent spillage during the dispensing operation.

14. The apparatus of claim 1 further including a sniffer tube in said nozzle means and connected to said control means for actuating said control means to close said valve means when the end of said sniffer tube is blocked.

15. The apparatus of claim 14 further including pressure sensitive means between said sniffer tube and said control means for reopening said valve means when said sniffer tube is unblocked during the dispensing operation.

16. The apparatus of claim 1 wherein said positioning means moves said head member vertically during the dispensing operation in response to a change in the position of said tank inlet.

17. The apparatus of claim 5 wherein said head member comprises an elongated housing having said flap-opening means extending therethrough, said flap-opening means comprising:
a rotatable drive screw extending longitudinally through said housing;
drive means connected to said drive screw for rotating said screw;
four positioning motors each having a rotor and a stator and mounted on a common rotational axis, said stators being in fixed rotational alignment and connected to said drive screw;
four concentric rotatable shaft members, each connected at its inboard end to the rotor of a corresponding one of said positioning motors;
said motors and said shafts being slidable in said housing by the rotation of said screw;
a knuckle member at the outboard end of said shaft members, said knuckle member comprising an upper housing and a lower housing, said upper housing being rotatable in respect of said lower housing;
a finger member in said upper housing, said finger member being extendible and rotatable in respect of said upper housing;
one of said shaft members being operatively connected to said upper housing to rotate said upper housing, the second of said shaft members being operatively connected to said finger member to rotate said finger member in said upper housing and the third of said shaft members being operatively connected to said finger member to extend and retract said finger member in respect of said knuckle member; and
transducer means connected to said motors for providing information as to the angular positions of the rotors thereof.

18. The apparatus of claim 10 wherein said cap-removal means comprises a hollow arm member slidably positioned in said head member; threaded projecting means for extending and retracting said arm member; a rotatable torque tube extending through said arm member; a torque limiting clutch connected to said torque tube; drive means connected to said torque tube for rotating said torque tube; a flexible shaft connected to the outboard end of said torque tube; and cap-engaging means at the outboard end of said flexible shaft.

19. The apparatus of claim 10 wherein said cap-engaging means is flexibly connected to said arm member.

20. The apparatus of claim 1 wherein said nozzle projection means comprises projection arm means connected to said nozzle means; rotatable screw means connected to said projection arm means to slide said nozzle in said head member; and drive means connected to said screw means to rotate said screw means.

21. Fluid dispensing apparatus comprising:
an elongated housing;
nozzle means slidably positioned in said housing;
nozzle projection means connected to said nozzle means for alternately extending said nozzle outwardly from said housing and retracting said nozzle means into said housing;
fluid supply means connected to said nozzle means;
valve means connected to said fluid supply means for controlling the flow of fluid therethrough;
control means connected to said valve means for opening and closing said valve means;
flap-opening means slidably positioned in said housing for opening and closing a flap over the inlet of a tank;
flap-opening operating means operatively connected to said flap-opening means to extend and retract said flap-opening means and to actuate said flap-opening means;
cap-removal means slidably positioned in said housing for removing and replacing a cap on said tank inlet; and
cap-removal operating means operatively connected to said cap-removal means to extend and retract said cap-removal means and to actuate said cap-removal means.

22. The apparatus of claim 21 wherein said flap-opening means comprises an arm member positioned in said housing and extendible therefrom, a knuckle member at the outboard end of said arm and a finger member rotatably connected to said arm member by said knuckle member.

23. The apparatus of claim 22 wherein said finger member is extendible from said knuckle member and rotatable in respect of said housing.

24. The apparatus of claim 21 wherein said cap-removal means comprises an arm member slidably extending through said housing and provided at its outboard end with a cap-engaging means, said cap-engaging means being rotatable in said housing.

25. The apparatus of claim 24 wherein said cap-removal means is provided with a torque limiting clutch to limit the torque applied to said cap by said cap-engaging means.

26. The apparatus of claim 21 further including a vent tube attached to said nozzle means for conducting vapors from said tank during the dispensing operation.

27. The apparatus of claim 21 further including seal means adjacent the outboard end of said nozzle means for sealingly engaging with said tank inlet to prevent spillage during the dispensing operation.

28. The apparatus of claim 21 further including a sniffer tube in said nozzle means and connected to said control means for actuating said control means to close said valve means when the end of said sniffer tube is blocked.

29. The apparatus of claim 28 further including pressure sensitive means between said sniffer tube and said control means for re-opening said valve means when said sniffer tube is unblocked during the dispensing operation.

30. The apparatus of claim 21 wherein said flap-opening means comprises an elongated housing having said flap-opening means extending therethrough, said flap-opening means comprising:
a rotatable drive screw extending longitudinally through said housing;
drive means connected to said drive screw for rotating said screw;
four positioning motors each having a rotor and a stator and mounted on a common rotational axis, said stators being in fixed rotational alignment and connected to said drive screw;

four concentric rotatable shaft members, each connected at its inboard end to the rotor of a corresponding one of said positioning motors;

said motors and said shafts being slidable in said housing by the rotation of said screw;

a knuckle member at the outboard end of said shaft members, said kunckle member comprising an upper housing and a lower housing, said upper housing being rotatable in respect of said lower housing;

a finger member in said upper housing, said finger member being extendible and rotatable in respect of said upper housing;

one of said shaft members being operatively connected to said upper housing to rotate said upper housing, the second of said shaft members being operatively connected to said finger member to rotate said finger member in said upper housing and the third of said shaft members being operatively connected to said finger member to extend and retract said finger member in respect of said knuckle member; and transducer means connected to said motors for providing information as to the angular positions of the rotors thereof.

31. The apparatus of claim 21 wherein said cap-removable means comprises a hollow arm member slidably positioned in said housing; threaded projecting means for extending and retracting said arm member; a rotatable torque tube extending through said arm member; a torque limiting clutch connected to said torque tube; drive means connected to said torque tube for rotating said torque tube; a flexible shaft connected to the outboard end of said torque tube; and cap-engaging means at the outboard end of said flexible shaft.

32. The apparatus of claim 31 wherein said cap-engaging means is flexibly connected to said arm member through a coil spring.

33. The apparatus of claim 21 wherein said nozzle projection means comprises projection arm means connected to said nozzle means; rotatable screw means connected to said projection arm means to slide said nozzle in said housing; and drive means connected to said screw means to rotate said screw means.

34. The apparatus of claim 21 further including a power pack assembly positioned in said housing and operatively connected to each of said nozzle projection means, said flap-opening operating means and said cap-removal operating means.

References Cited

UNITED STATES PATENTS

| | | | |
|---|---|---|---|
| 2,811,817 | 11/1957 | Mojonnier | 53—381 X |
| 3,056,436 | 10/1962 | Fechheimer | 141—147 X |
| 3,093,165 | 6/1963 | Risser | 141—140 |
| 3,095,020 | 6/1963 | Darwin | 137—234.6 X |
| 3,254,683 | 6/1966 | Jennings et al. | 141—128 |

FOREIGN PATENTS 610,618  12/1960  Canada.

LAVERNE D. GEIGER, *Primary Examiner.*

E. J. EARLS, *Examiner.*